Figure 4:
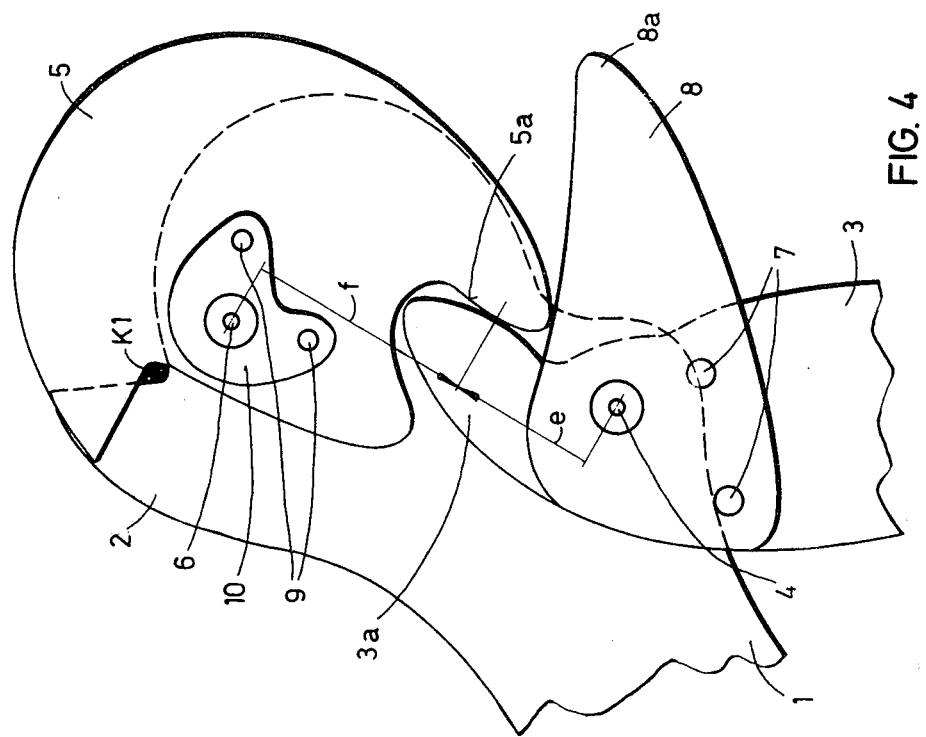
Figure 3:
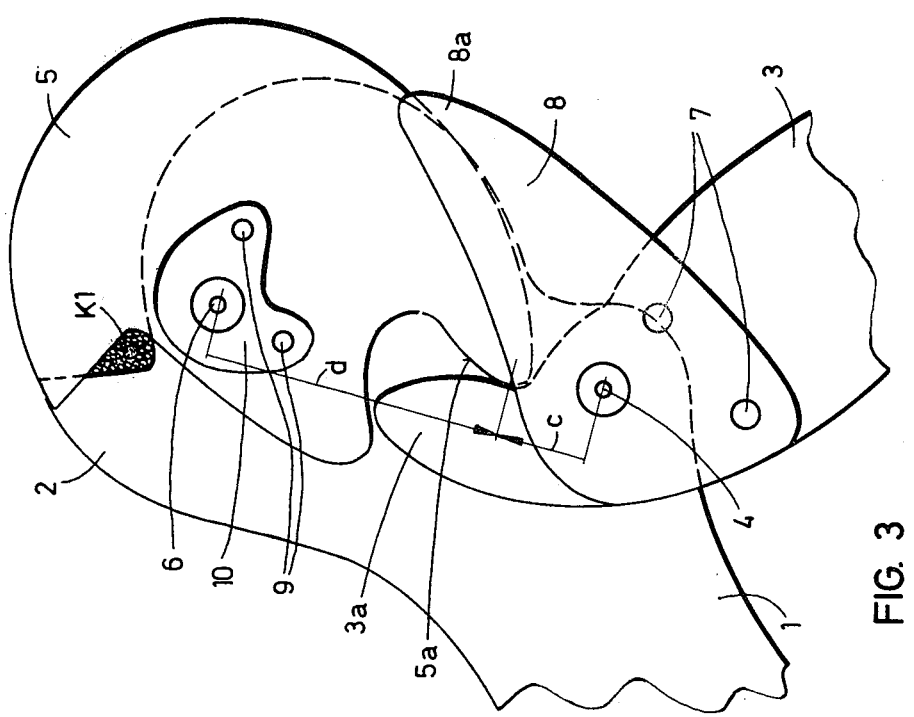
Figure 5:
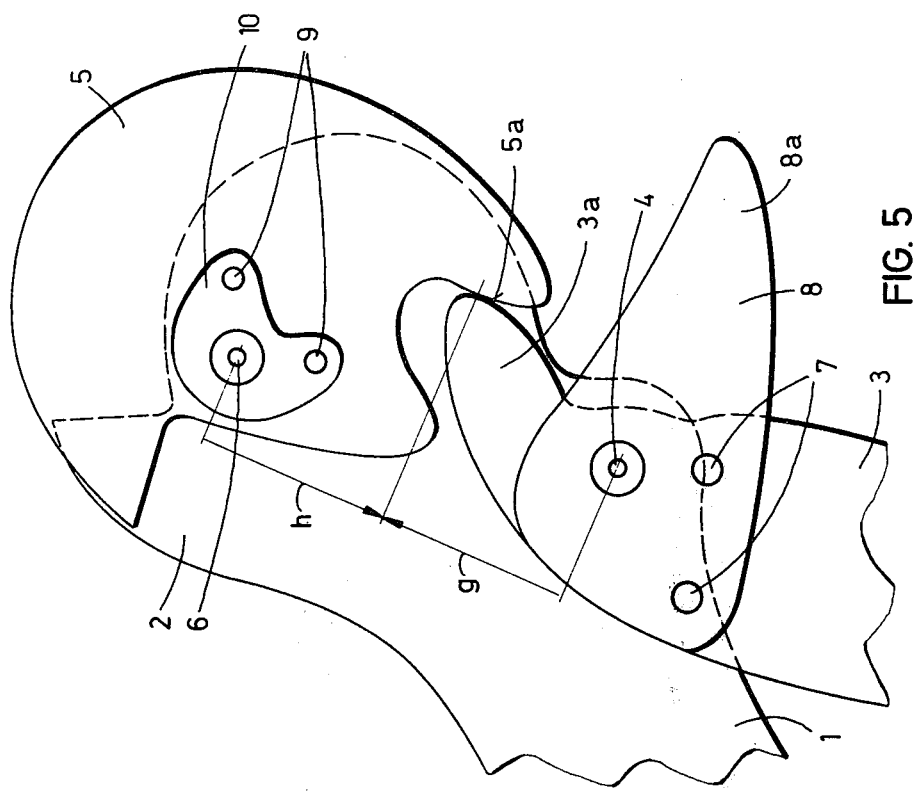

United States Patent [19]

Flisch

[11] 4,050,153
[45] Sept. 27, 1977

[54] CABLE AND WIRE-ROPE CUTTER

[76] Inventor: Félix Flisch, Rue des Melezes, Geneveys-sur-Coffrane Cant. Neuchatel, Switzerland, 2206

[21] Appl. No.: 715,893

[22] Filed: Aug. 19, 1976

[30] Foreign Application Priority Data

Aug. 25, 1975 Switzerland .................. 11000/75

[51] Int. Cl.² ............................... B26B 13/00
[52] U.S. Cl. ..................................... 30/250
[58] Field of Search ............... 30/249, 250, 252, 189, 30/248; 81/342, 343, 344

[56] References Cited

U.S. PATENT DOCUMENTS

| 512,086 | 1/1894 | Ashcraft | 81/343 X |
| 3,243,880 | 4/1966 | Weller | 30/250 |
| 3,885,309 | 5/1975 | Lund | 30/250 |

Primary Examiner—Jimmy C. Peters
Attorney, Agent, or Firm—Schroeder, Siegfried, Ryan & Vidas

[57] ABSTRACT

In a cable and wire-cutter comprising first and second handles pivoted on one another, a first cutting jaw formed on the first handle and a second cutting jaw pivoted on the first handle; two toothed drive connections are provided between the second cutting jaw and the second handle and work consecutively and with differing multiplying ratios according to the power requirements needed until a cable or wire rope is enclosed on all side by the jaws and thereafter to cut the cable or wire rope.

4 Claims, 9 Drawing Figures

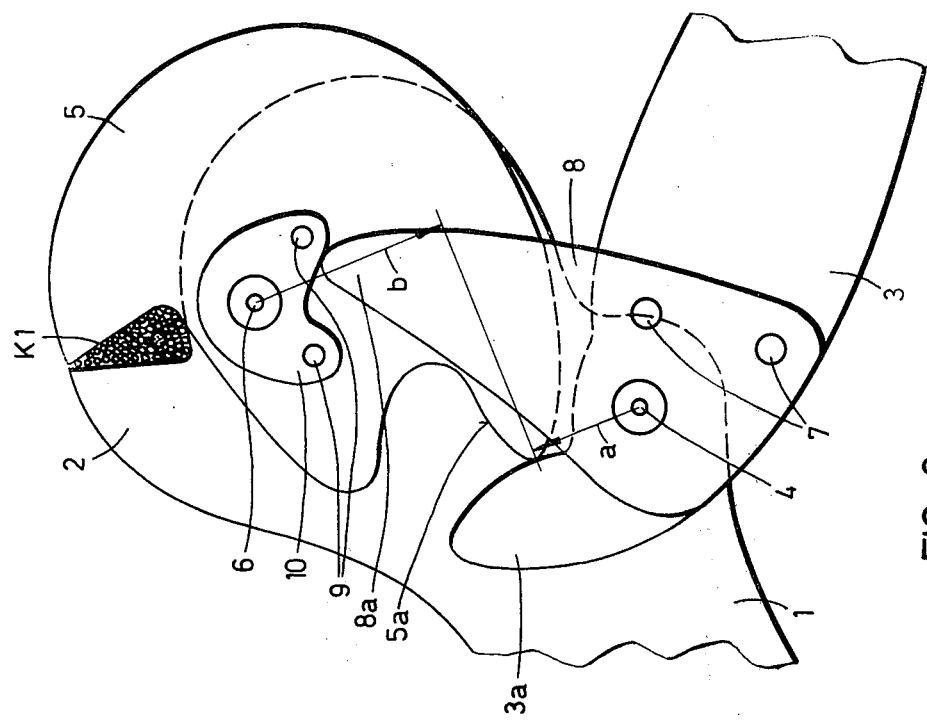
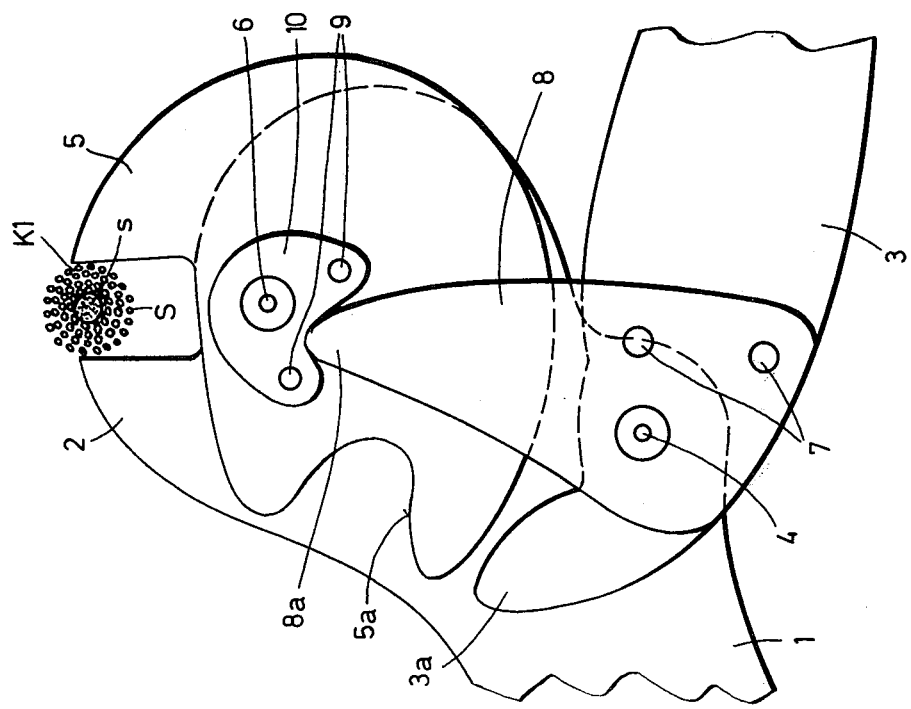
FIG. 2
FIG. 1

CABLE AND WIRE-ROPE CUTTER

This invention relates to a cable and wire-rope cutter. In such cutters, very great power multiplication is aimed at for the actual cutting operation. Unless special steps are taken, however, this means that a considerable initial part of the pivoting motion of the two handles is used up in closing the handles before the actual cutting operation has begun; as a result, a correspondingly reduced pivoting angle is available for carrying out the cutting operation, and the reduction of path and multiplication of power consequently turn out less favorable than desired.

In certain known designs, including that disclosed in German utility Model No. 1,970,329, allowance is made for this drawback in that a support of a bent lever mechanism can be advanced between successive pivoting manipulations of the handles, while in other known designs, including those shown in German Patents Nos. 326,669 and 521,081, a ratchet wheel rotated forward step by step upon successive pivoting manipulations of the handles is provided in the transmission mechanism. All these designs thur require repeated manipulations and, upon opening of the cutters, an additional return. Furthermore, their construction is complicated, often susceptible to trouble and heavy as well.

U.S. Pat. Nos. 2,647,312 and 2,682,785 show rather light-weight tools, appropriate for such uses as cutting through wires and thinner electric cables, in which two rollers are inserted one behind the other on the short front arm of one of the handles made of stamped sheet metal. In the course of the closing movement, these rollers ride one after the other on a surface formed on the rear arm of a two-armed lever mounted on the other handle, the front arm of which lever forms the movable cutting jaw.

These two tools do achieve the purpose of transmitting the torque exerted on the handles with an increasing power multiplying ratio to the mentioned two-armed lever, i.e., to the movable jaw, as the closing movement progresses. A first disadvantage, however, is that the available angle of rotation of the handles is only about 45°, for an angle of rotation of the jaw of about 25°. Another significant drawback is that the opening movement of the movable jaw does not occur positively but under the effect of a return spring. In the case of cutters designed for cutting through thick steel cables, wire ropes, and the like, however, the movable jaw must be moved very closely along the stationary jaw; the substantial friction then unavoidably occurring could never be overcome by such a return spring.

The point of departure of the present invention is a cable and wir-rope cutter having two handles pivoted on one another, a first one of these handles bearing a first cutting jaw formed rigidly thereon and a second cutting jaw pivoted thereon, and the second handle being operatively connected to the second jaw by means of teeth.

A rather elementary design of a cable cutter of this kind, which is actually no more than a pair of pliers, is disclosed in French Patent No. 488,129. The power multiplying ratio is invariable over the entire range of movement, being about 2:1, with a possible angle of rotation of the legs of less than 30° and corresponding to an angle of rotation of the jaws of less than 15°.

It is an object of this invention to provide a cable and wire-rope cutter of the aforementioned kind which, while avoiding the disadvantages associated with the prior art, is suitable for cutting through quite thick cable and wire rope made entirely or for the most part of hard wires of steel or the like. The design of the cutter should take into account the fact that in a first phase of the closing movement, namely, for deforming the cross-section of the cable from its originally round state into a state in which the cable is snugly enclosed by the cutting jaws on all sides, the amount of force required is many times less than that needed for the actual cutting of the cable. For this latter operation, a pivoting path of some considerable length should be available for the second (i.e., the "movable") jaw. For both operations together, a much longer pivoting path than is provided by the prior art designs should be available for the handles.

According to one aspect of the present invention, this object is achieved in that the second handle is provided with two tooth elements, one of which engages the second jaw only for moving it from the open position into a position in which a cable or wire rope is enclosed on all sides by both jaws, and the other of which, starting from this position, becomes operative for the cutting movement of the second jaw past the first jaw, the two tooth elements having differing multiplying ratios corresponding to the differing power requirements for bringing the jaws together and for the subsequent cutting of a cable or wire rope.

According to another aspect of the present invention, the aforementioned object is achieved in that the second handle is provided with a first driving tooth element and a second driving tooth element which are disposed adjacent to one another in the direction of the parallel axes of rotation of the handles and the cutting jaws and which successively cooperate, during the pivoting of the handles towards and away from each other over a total path of rotation of more than 100°, with first and second driven tooth elements correspondingly disposed adjacent to one another on the second jaw, in such a way that in a first part of the movement of the handles towards one another, amounting to about 8° to 16°, the two jaws are moved from the open position over a path of rotation of about 12° to 36° into a position in which they grip a cable or wire rope on all sides after deformation of the cross-section thereof has taken place, whereas in the remaining part of the movement of the handles towards one another, the two jaws are further pivoted by at least 40° for cutting through the cable or wire rope. In a preferrd embodiment of the invention, the second driving tooth element acting during the actual cutting of the cable or wire rope is formed in one piece with the second handle and the second driven tooth element is formed in one piece with the second cutting jaw, whereas the first driving tooth element is formed at a free end of a cam attached to the second handle and the first driven tooth element associated therewith consists of a heart-piece attached to the second cutting jaw.

Figure 8:
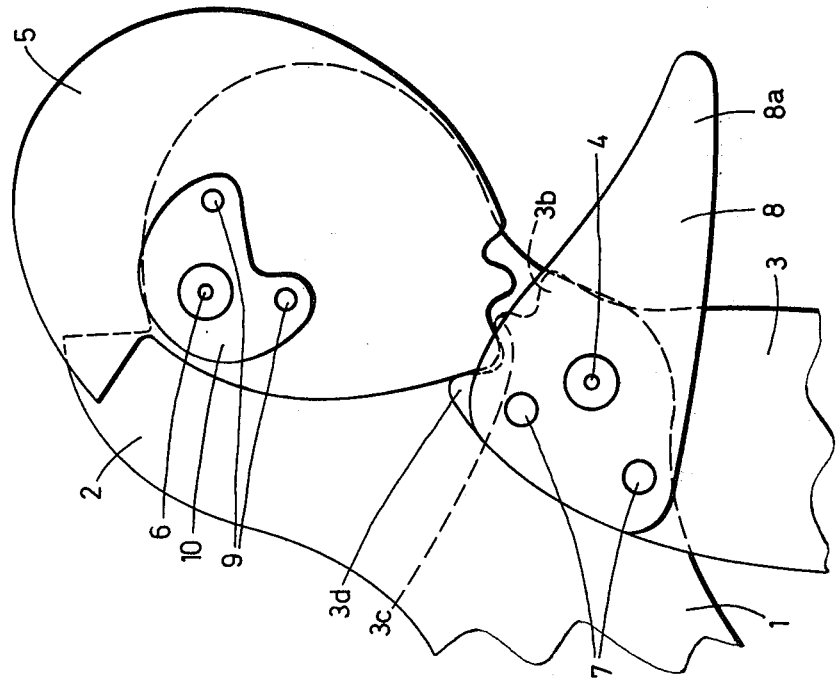
Figure 7:
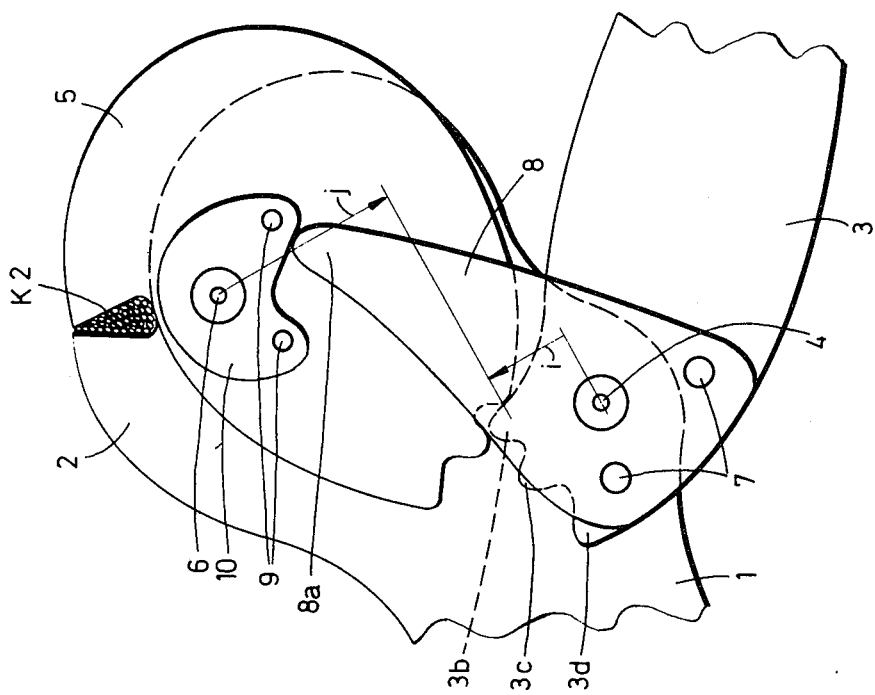
Figure 6:
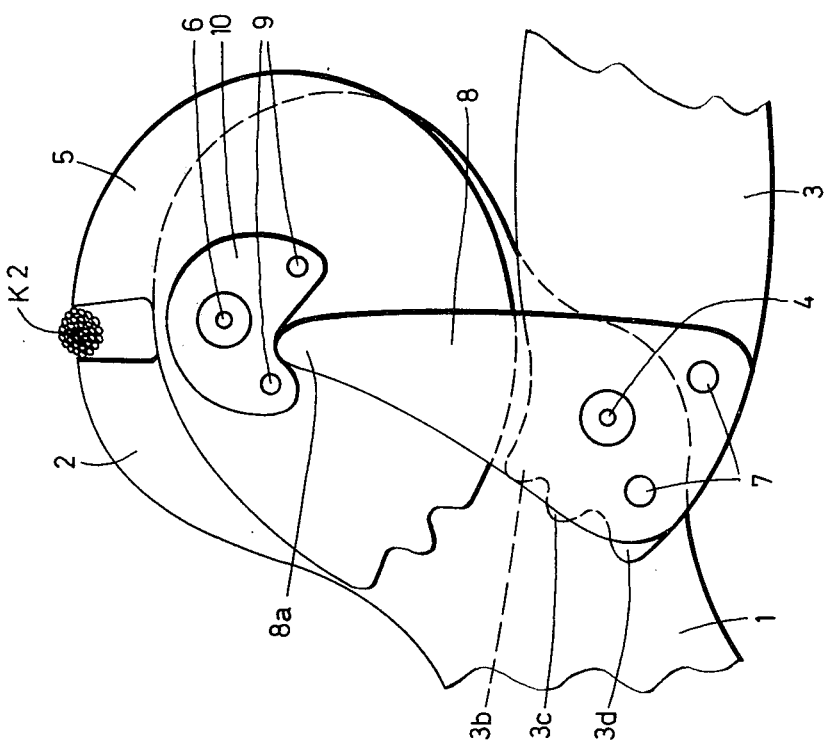
Figure 9:
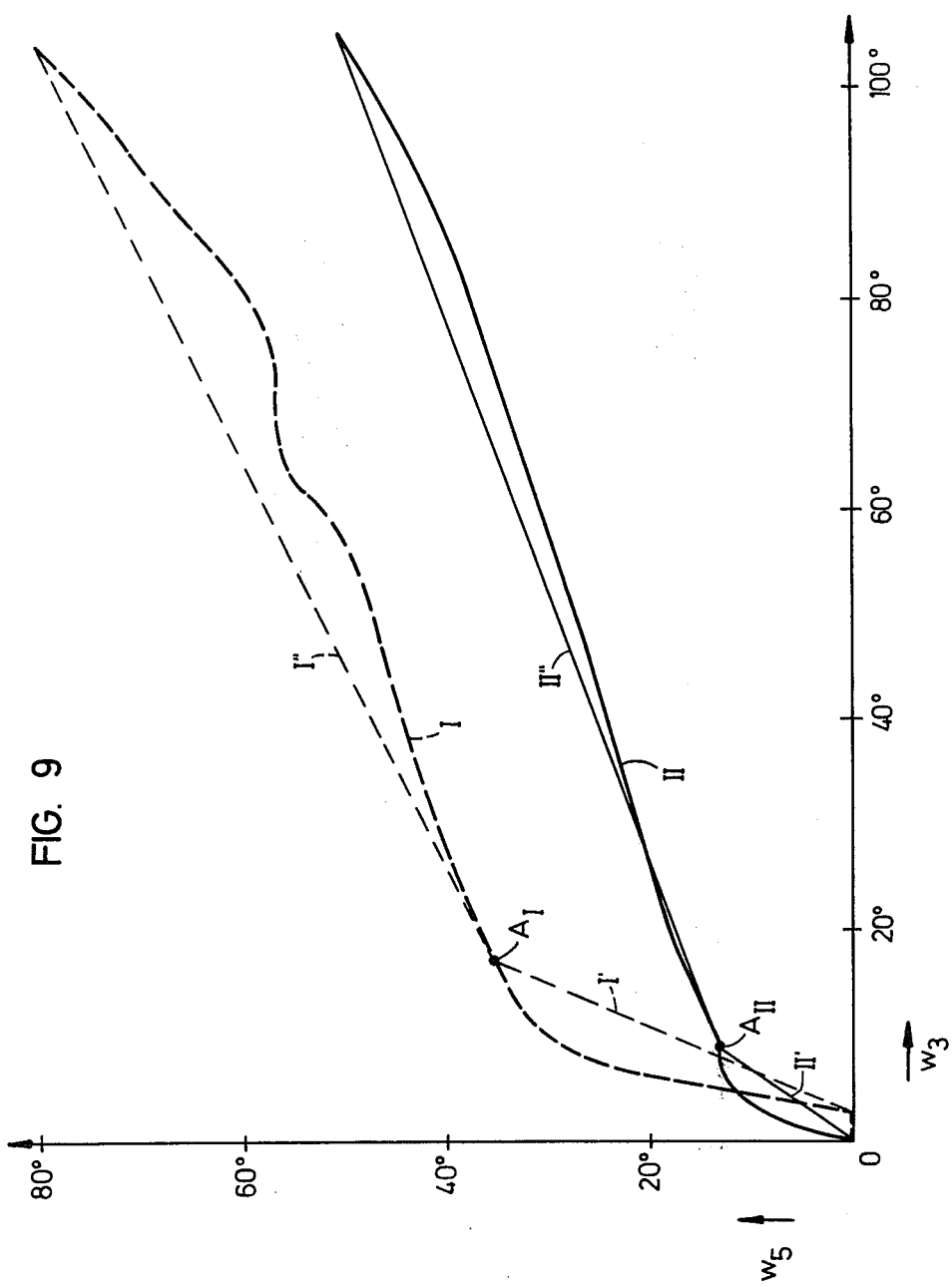

Two possible embodiments of the invention will now be described in detail with reference to the accompanying drawings, in which:

FIGS. 1 to 5 are similar partial elevations of a first embodiment, in five different positions, FIGS. 6 to 8 are similar partial elevations of a second embodiment in three different positions, and FIG. 9 is a diagram illustrating for both embodiments the path of the movable cutting jaw as a function of the path of the cutter handles with respect to one another, curve I applying to the first embodiment and curve II to the second embodiment.

The cutter illustrated in FIGS. 1-5 is particularly suitable for cutting through a cable $K_2$, in which a hemp core s is surrounded by many fine, but extremely hard, steel wires S. Prior to the actual cutting operation, such a cable $K_1$ undergoes a deformation of its cross-section approximately from the shape shown in FIG. 1 to that shown in FIG. 2, for which purpose very little force is required, but which in the known cutters has used up a considerable part of the pivoting path of the cutter handles, which is then naturally no longer available for the following cutting operation. The embodiment illustrated in FIGS. 6-8 is particularly suitable for a cable $K_2$ which consists only of wires twisted together and which, prior to the actual cutting operation, undergoes a deformation of its cross-section from the originally round shape shown in FIG. 6 to a substantially triangular shape as shown in FIG. 7. Thus the aim has been to provide a cutter design in which the pivoting movement of the movable jaw required for cutting is preceded by a "quick stroke" over a considerable path of rotation, but in which only a small part of the total path of rotation of the cutter handles need be covered in order to carry out this "quick stroke". In both embodiments shown, a first cutting jaw 2 is rigidly formed on a first handle 1, a second handle 3 is pivoted on the handle 1 at a point 4, and a second cutting jaw 5 is also pivoted on the handle 1 at a point 6. A cam 8 is secured to the handle 3 by means of the pivot situated at the pivot point 4 and by two rivets or pins 7; a heart-piece 10 is secured to the jaw 5 by means of the pivot situated at the pivot point 6 and by two pins or rivets 9.

In the completely open position-cf. FIGS. 1 and 6— only one tooth engagement exists between a "first driving tooth element" 8a at the free end of the cam 8 and the "first driven tooth element" consisting of the heart-piece 10; this one tooth engagement continues to exist upon pivoting of the handles 1, 3 into the positions shown in FIGS. 2 and 7, respectively, in which, in the first embodiment, a single tooth 3a formed in one piece with the handle 3 comes into engagement, as the "second driving tooth element", with one side 5a of a tooth gap formed in the jaw 5 (the limits of this tooth gap forming the "second driven tooth element"), and in which, in the second embodiment, the first of three teeth 3b, 3c, 3d (here forming the "second driving tooth element") comes into engagement with a corresponding side of a matching toothing (here forming the "second driven tooth element") of the jaw 5.

During the continuation of the closing movement out of the positions shown in FIGS. 2 and 7, respectively, the first of the two tooth engagements ceases to exist and only the second remains, by means of which the jaw 5 is slowly pivoted to carry out the cutting operation (cf. FIGS. 3-5 and FIG. 8, respectively).

In the motional diagrams, FIG. 9, which are based upon measurements carried out on prototypes, the path $W_3$ of the handle 3 measured in degrees of angle, is plotted on the x-axis with respect to the stationary handle 1, and the path $W_5$ of the movable jaw 5, also measured in degrees of angle, is plotted on the y-l-axis with respect to the stationary jaw 2. It will be obvious that the slope of the curves indicates the path reduction ratio and, as the reciprocal value, the power multiplying ratio. Curve I applies to the first embodiment, curve II to the second embodiment. It will be seen that the curves rise very steeply up to points $A_I$ and $A_{II}$, corresponding to the positions shown in FIGS. 2 and 7, respectively; thereafter, the gradient is much less steep. The path reduction ratio varies in the case of the first embodiment from an initial value of about 5:1 to a value of $a:b = 18:33$ (FIG. 2; $A_I$ in FIG. 9), then $c:d = 15:49$ (FIG. 3), $e:f = 25:37$ (FIG. 4), $g:h = 31.33$ (FIG. 5); and in the case of the second embodiment from an initial value of about 5:1 to a value of $i:j = 14:31$ (FIG. 7; $A_{II}$ in FIG. 9), then somewhat greater.

It will be immediately apparent from a comparison of FIGS. 1 to 5, as well as from a comparison of FIGS. 6 to 8, and is also confirmed by curves I and II of FIG. 9, that:

a. the total path of rotation available for the two handles 1, 3 amounts to more than 100° (according to FIG. 9, it amounts to 104° for both embodiments);

b. the first part of the movement of the handles towards each other, viz., from the position of FIG. 1 to that of FIG. 2, or from the position of FIG. 6 to that of FIG. 7, amounts to about 8° to 16° (14° according to curve I, about 8° according to curve II);

c. the corresponding first part of the rotation of the movable jaw amounts to about 12° to 36° (compare, for instance, curves I and II); and d. the remainder of the rotation of the movable jaw amounts to at least another 40° (viz., 45° according to curve I and 40° according to curve II). The "average multiplying ratios" for the two phases of operation (i.e., before $A_I$ or $A_{II}$ and after $A_I$ or $A_{II}$) may also be easily determined from the two curves. These "average multiplying ratios" can be read off in FIGS. 9 as gradients of the straight lines I', I" and II', II", respectively. The factor by which these "average multiplying ratios" differ from one another amounts to 4.5 for the first embodiment and to 3.7 for the second embodiment. During opening of the cutter, the operations succeed one another in reverse order, and then, too, the movement of the movable jaw is carried out positively, so that there is no need for a return spring.

I claim:

1. A cable and wire-rope cutter comprising first and second handles pivoted on one another, a first cutting jaw formed rigidly on said first handle, a second cutting jaw pivoted on said first handle, and tooth means operatively connecting said second handle with said second jaw, wherein said tooth means comprise two tooth elements disposed on said second handle one of which is attached to the second handle and the other being formed integral therewith, one of said tooth elements engaging said second jaw for moving it from a position in which it is spaced to a maximum extent from said first jaw into a position in which said second jaw is enabled to cooperate with said first jaw for enclosing a cable or wire rope on all sides, and the other of said tooth elements thereafter engaging said second jaw for moving it past said first jaw, whereby said first and second jaws are enabled to cooperate with cutting said cable or wire rope, said tooth elements having differing multiplying ratios respectively corresponding to the differing power requirements for enclosing and for cutting said cable or wire rope.

2. A cutter in accordance with claim 1, further comprising a heart-piece attached to said second jaw at least at the pivoting point thereof, wherein said one tooth element is a cam attached to said second handle and said other tooth element is a tooth-like projection extending from said second handle, said cam engaging said second jaw via said heart-piece, and said tooth like projection engaging said second jaw directly.

3. A cable and wire-rope cutter comprising first and second handles pivoted on one another for rotation towards and away from one another over a total path of rotation of more than 100°, a first cutting jaw formed rigidly on said first handle, a second cutting jaw pivoted on said first handle, the axes of rotation of said handles and of said jaws being parallel, tooth means operatively connecting said second handle with said second jaw, said tooth means including first and second driving tooth elements disposed adjacent to one another in the direction of said axes of rotation on said second handle with said first driving tooth element being attached to said second handle and the second driving tooth element being formed integral with said second handle, said tooth means further including first and second driven tooth elements disposed adjacent to one another in the direction of said axes of rotation and said second jaw with said first driven tooth element being attached to said second jaw and the second driven tooth element being formed integral with said second jaw, said first driving tooth element first cooperating with said first driven tooth element for moving said second jaw through an angle of about 12° to 36° when said handles are moved towards one another over about 8° to 16° of their said path of rotation, from a position in which said second jaw is spaced to a maximum extent from said first jaw into a position in which said second jaw enabled to cooperate with said first jaw for enclosing a said cable or wire rope on all sides, thereby deforming the cross-section of said cable or wire rope, and said second driving tooth element then cooperating with said second driven tooth element for moving said second jaw past said first jaw through an angle of at least 40° more when said handles are moved towards one another over the remainder of their said path of rotation, whereby said first and second jaws are enabled to cooperate for cutting said cable or wire rope.

4. A cutter in accordance with claim 3, further comprising a cam attached to said second handle, said first driving tooth element being formed at a free end of said cam, and said first driven tooth element being a heart-piece attached to said second jaw.

* * * * *

UNITED STATES PATENT AND TRADEMARK OFFICE
CERTIFICATE OF CORRECTION

PATENT NO. : 4,050,153
DATED : September 27, 1977
INVENTOR(S) : Felix Flisch

It is certified that error appears in the above-identified patent and that said Letters Patent are hereby corrected as shown below:

Column 1, line 24, delete "thur" and insert - thus -

" line 54, delete "wir-rope" and insert - wire-rope

Signed and Sealed this

Third Day of January 1978

[SEAL]

Attest:

RUTH C. MASON
Attesting Officer

LUTRELLE F. PARKER
Acting Commissioner of Patents and Trademarks